R. E. HELLMUND.
SYSTEM OF CONTROL.
APPLICATION FILED MAR. 14, 1917.
1,328,513. Patented Jan. 20, 1920.
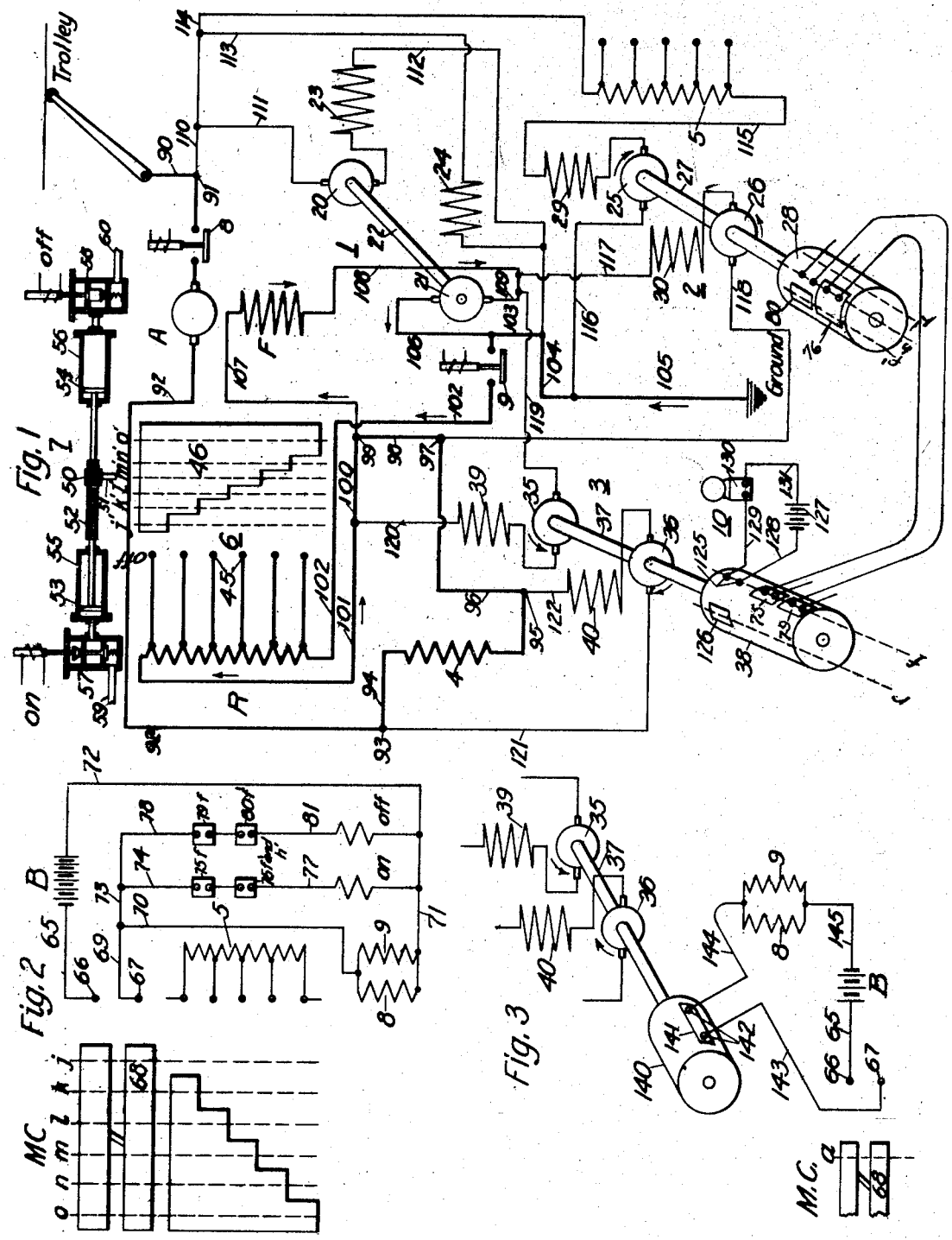
WITNESSES:
Fred. C. Wilharm
W. R. Coley
INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,328,513.  Specification of Letters Patent.  Patented Jan. 20, 1920.

Application filed March 14, 1917. Serial No. 154,864.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Systems of Control, of which the following is a specification.

My invention relates to systems of control and especially to the regenerative control of electric-vehicle motors and the like.

The object of my invention is to provide a control system of the above-indicated character which shall be adapted to effect the automatic maintenance of a predetermined speed during the regenerative period over a certain stretch of track, irrespective of grade or curve variations which would normally tend to considerably vary the vehicle speed.

More specifically stated, it is the object of my invention to provide torque-controlled relay devices for so varying circuit connections during the regenerative period, as the vehicle passes over a certain portion of the track, that an automatic change of retarding effort occurs to compensate for the variation of track conditions and thus maintain a substantially constant vehicle speed. I also provide manually operated means for preselecting the speed desired.

My invention may best be understood by reference to the accompanying drawing, wherein Figure 1 is a diagrammatic view of the main circuits and auxiliary-machine circuits of a system of control embodying my present invention; Fig. 2 is a diagrammatic view of an auxiliary system for governing the main-circuit connections shown in Fig. 1; and Fig. 3 is a diagrammatic view of a modification of a portion of the auxiliary-machine circuits illustrated in Fig. 1.

Referring to Fig. 1 of the drawing, the system shown comprises suitable supply-circuit conductors respectively marked "Trolley" and "Ground"; a main dynamo-electric machine having an armature A and a field winding F of the series type; an auxiliary motor-generator set 1 driven from the supply circuit and adapted to excite the main field winding F, as hereinafter traced in detail; a speed relay 2 and an overload relay 3 for purposes to be pointed out; a main-circuit shunting resistor 4 that is employed in connection with the overload relay 3; an auxiliary-circuit resistor 5 that is associated with the speed relay 2 to vary the operation thereof, as subsequently set forth; a main-circuit stabilizing resistor R, which is governed in accordance with the movements of a controller 6 that is provided with an operating mechanism 7; a plurality of main-circuit switches 8 and 9; and an alarm system 10, for a purpose to be explained.

The motor-generator set 1 comprises a motor or driving armature 20 that is mechanically connected to a generator or exciting armature 21 by means of a shaft 22 or otherwise; a series-related field winding 23 for the motor armature 20 and a shunt-excited field winding 24 for the generator armature 21.

The speed relay 2 is of the differential torque-motor type and comprises opposing armatures 25 and 26 that are mechanically associated by a shaft 27 upon which is also mounted a small drum controller 28, or its equivalent, that is adapted to occupy three positions $f'$, $h'$ and $r'$ to govern the actuating circuits of the controller-operating mechanism 7, as hereinafter described. The armatures 25 and 26 are provided with series-related field windings 29 and 30 which are respectively energized from the supply circuit and from the main field winding F.

The overload relay 3 is of a similar type and embodies opposing armatures 35 and 36 that are mounted upon a common shaft 37, which also carries a small drum controller 38 that is adapted to occupy two positions $f$ and $r$ for suitably governing the operation of the actuating mechanism 7 for the controller 6. Series-related field windings 39 and 40 are provided for the respective armatures 35 and 36, being energized from the main field winding F and from the main-circuit shunting resistor 4, respectively.

The main controller 6 embodies a plurality of control fingers 45 that are connected to various points of the main-circuit stabilizing resistor R and a movable contact segment 46 for gradually excluding the resistor R from circuit, as the controller is actuated through its operative positions $j'$ to $o'$, inclusive.

The operating mechanism 7 for the controller 6 is of a familiar electrically-controlled pneumatically-actuated type and comprises a pinion 50 which is rigidly secured to one end of the controller shaft 51 and is adapted to mesh with a horizontally-movable rack member 52, the opposite ends of which constitute pistons 53 and 54 that travel within suitable operating cylinders 55 and 56, respectively. A normally closed valve 57 is associated with the outer end of the cylinder 55, and a normally open valve 58 communicates with the outer end of the other cylinder 56, fluid pressure being supplied to the valves 57 and 58 through suitable pipes or passages 59 and 60, respectively, from any suitable source (not shown). By reason of the normally open condition of the valve 58, the operating mechanism is biased to one extreme position, as illustrated, which corresponds to the normal or "off" position of the controller 6. Suitable actuating coils "On" and "Off" are adapted, when energized, to actuate the respective valves 57 and 58 to their opposite position, under predetermined conditions to be set forth.

The mechanical operation of the mechanism just described, without regard to the electrical connections effected thereby, may be set forth as follows: To produce a "forward" movement of the controller 6, the actuating coils "On" and "Off" are concurrently energized, whereby the initial fluid-pressure conditions in the operating mechanism are reversed, that is, fluid pressure is admitted to the cylinder 55 through the valve 57 and is exhausted from the cylinder 56 through the other valve 58. Thus, movement of the pistons 53 and 54 toward the right occurs to actuate the controller 6 through its successive operative positions. To arrest such movement at any time, it is merely necessary to deënergize the "off" coil, whereupon fluid-pressure conditions in the mechanism are balanced to produce a positive and reliable stoppage thereof.

To effect a return or "backward" movement of the controller 6, the actuating coils "On" and "Off" are concurrently deënergized, whereby fluid-pressure conditions in the device revert to the original state, and the desired return movement toward the illustrated position occurs.

Reference may now be had to Fig. 2, wherein the auxiliary governing system shown comprises the actuating coils "On" and "Off" for the operating mechanism 7 and the actuating coils for the switches 8 and 9; and a master controller MC that is adapted to occupy a plurality of operative positions $j$ to $o$, inclusive, for energizing the various actuating coils from a battery B or other suitable source of energy, such energization being also dependent upon the positions of the small controllers 28 and 38 of the speed relay and the overload relay, respectively. The master controller is also adapted, when actuated through its operative positions, to gradually exclude the auxiliary resistor 5 from circuit to thereby govern the operation of the speed relay 2, as hereinafter described in detail.

Inasmuch as the particular means for inaugurating regenerative operation is immaterial to my present invention, I have not deemed it advisable to complicate the illustrated system with any such arrangement. Assuming, therefore, that the master controller MC has been actuated to its initial operative position $j$ and that regenerative operation has been begun, one auxiliary circuit is completed from the positive terminal of the battery B through conductor 65, control fingers 66 and 67—which are bridged by contact segment 68 of the master controller —conductors 69 and 70, the parallel-related actuating coils of the switches 8 and 9, and conductors 71 and 72 to the negative battery terminal.

A further circuit is established from conductor 69 through conductors 73 and 74, interlock or contact member 75 of the overload relay 3, in its normal position $f$, interlock or contact member 76 of the speed relay 2, in either of its positions $f'$ or $h'$ conductor 77 and the actuating coil "On" to the negative conductor 71.

A circuit is concurrently completed from the conductor 73 through conductor 78, contact member 79 of the overload relay 3 in its position $f$, contact member 80 of the speed relay 2, when occupying its position $f'$, conductor 81 and the actuating coil "Off" to the negative conductor 72. Thus, provided the various relays occupy the positions indicated, concurrent energization of the "on" and "off" coils takes place to produce forward movement of the controller 6, in accordance with the previously-described operating principles, to thereby exclude sections of the stabilizing resistor R from circuit. By thus varying the main-circuit resistance, the retarding effort of the momentum-driven machine or machines is correspondingly varied, whence it will be seen that, if such variation of circuit resistance can be accomplished automatically to counteract variations of track grades and curves, a substantially constant vehicle regenerative speed, over a certain stretch of track, will be maintained.

The main circuit, initially completed by the above-described manipulation of the master controller, extends from the trolley through conductor 90, junction-point 91, switch 8, the main armature A, conductor 92, junction-point 93, conductor 94, shunting resistor 4, junction-point 95, conductor 96, junction-point 97, conductor 98, junction-point 99, conductors 100 and 101, the entire stabilizing resistor R, conductor 102, switch 9 and conductors 103, 104 and 105 to the negative supply-circuit conductor Ground.

The main-field-winding exciting circuit is established from the positive terminal of the auxiliary generator armature 21 through conductor 106, switch 9, conductor 102, stabilizing resistor R, conductors 101, 100 and 107, main field winding F and conductors 108 and 109 to the negative terminal of the generator armature 21. Thus, as indicated by the arrows, the exciting or main-field-winding current traverses the resistor R in the same direction as the main-armature or regenerative current. Such an arrangement of parts is fully set forth and claimed in my copending application, Serial No. 44,443, filed Aug. 9, 1915, patented Apr. 1, 1919, No. 1,298,706, and is employed in the present case merely as a preferred type of regenerative circuit. It will be appreciated, however, that the present invention may be utilized in connection with other types of regenerative control.

By reason of the circuit connections just recited, namely, the series relation of the main armature A and the stabilizing resistor R across the supply circuit and the connection of the main field winding F and the exciting armature 21 in parallel relation to the resistor R, the system is inherently adapted to counteract sudden variations of regenerated current, as the supply-circuit voltage fluctuates, for the following reasons.

Assuming an incipient increase of main-armature or regenerated current, the voltage drop across the stabilizing resistor R will immediately increase to a corresponding degree, whereby the voltage impressed upon the main field winding F by the exciting armature 21 is accordingly reduced, since the resistor R is also included in the main field-winding circuit. Thus, a decrease of main-machine excitation is inherently produced to cause the main-armature current to recede to a normal value. The converse action occurs in case of an incipient decrease of regenerated current. Thus, what may be termed a "negative compound" characteristic is inherently imparted, by the arrangement of external connections, to the momentum-driven main machine.

If, because of the motor characteristics, or for any other reason, the regenerated current reaches a predetermined limiting value, the overload relay 3 acts to reduce the current and thereby avoid "flash-over" difficulties in the main machine, by reason of the undesirably high ratio of armature ampere-turns to field-winding ampere-turns.

The armature 36 of the overload relay being connected across the main-circuit shunting resistor 4, is energized in accordance with the regenerated current and, since the armature 36 and its field winding 40 are connected in series relation, the torque exerted by the armature 36 is proportional to the square of the regenerated current. Similarly, the allied auxiliary armature 35 exerts a torque that is proportional to the square of the main-field-winding current. Normally, the action of the armature 35 predominates over the opposing torque of the armature 36 to maintain the contact members 75 and 79 in the illustrated closed position $f$ and thus maintain the energization of the circuits of the actuating coils "On" and "Off."

However, when the regenerated current attains the above-mentioned critical value, the torque of the armature 36 becomes greater than the opposing action of the armature 35 to rotate the small control drum 38 into its position $r$, thus deënergizing the circuits of both the "on" and the "off" coils and, consequently, causing a return movement of the controller 6 to gradually insert an increasingly greater amount of the stabilizing resistor R in circuit until a normal value of the regenerated current obtains, accompanied by a desirable ratio of armature ampere-turns to main-field-winding ampere-turns.

If desired, the above-described movement of the overload relay 3 to its position $r$ may be utilized to operate a signal in order that the train operator may know that the locomotive or car is exerting its maximum safe electric-braking effort and that the air-brakes should be employed to produce any additional braking effect. In the illustrated system, such a signal is automatically provided by the bridging of a pair of stationary contact members 125 by a movable contact member 126 in position $r$ of the overload relay 3, whereby a circuit is completed from any suitable source of energy, such as a battery 127, through conductor 128, coöperating stationary and movable contact members 125 and 126, conductor 129, alarm bell or other signal 130, and conductor 131 to the negative battery terminal.

The energizing circuit for the auxiliary motor armature 20 is established from the positive trolley conductor 90, through conductors 110 and 111, the armature 20, series-related field winding 23, conductor 112, and thence, through conductors 104 and 105, to the negative conductor Ground, whereby the auxiliary motor armature circuit is connected across the supply circuit. Similarly, the field winding 24 for the exciting armature 21 is energized from the supply circuit, one terminal of the field winding being connected through conductor 113 to the positively-energized conductor 110 and the other terminal of the field winding being connected to the negative conductor 104.

A further auxiliary circuit is completed from conductor 110 through conductor 114, variable auxiliary resistor 5, conductor 115, field winding 29 and armature 25 of the speed relay 2 and conductor 116 to the negative conductor 105. Thus, by variation of the resistor 5, the strength of the field winding 29 is correspondingly changed to increase or decrease the torque exerted by the corresponding armature 25 and, in this way, vary the setting of the speed relay.

The speed of the main machine is governed by the speed relay 2, by reason of the fact that such manual setting or adjustment of the torque exerted by the armature 25 is opposed by the torque produced by the allied armature 26, which is connected across the main field winding F. Thus, inasmuch as, for a given supply-circuit voltage, the main-machine speed is substantially inversely proportional to the main-field-winding strength, the balancing of the torques of the respective armatures 25 and 26 serve to maintain a substantially constant main-machine speed.

Movement of the speed relay 2, in the one or the other direction from the illustrated normal or balanced position $h'$, occurs as follows: In the one case, when the torque of the supply-circuit-excited armature 25 becomes greater, the relay is actuated to its position $f'$, wherein contact members 76 and 80 are both operative to respectively complete the circuits of the actuating coils "On" and "Off," as illustrated in Fig. 2 and thus produce forward movement of the controller 6 to gradually reduce the active-circuit value of the stabilizing resistor R until the torques of the armatures 25 and 26 again balance, whereupon the speed relay reassumes its illustrated position. The converse action takes place when the main-field-winding-excited relay armature 26 temporarily exerts the greater torque: that is, the speed relay 2 is moved to its position $r'$ to insert more of the resistor R in circuit.

The main machine will thus continue to operate at a substantially constant speed, irrespective of grade or curve conditions of the track until the braking effort of the machines causes the inevitable decrease of machine and vehicle speed after a predetermined time interval.

By then adjusting the auxiliary resistor 5 to correspondingly vary the torque exerted by the auxiliary armature 25 of the speed relay 2, a new setting of the relay is effected and movement of the relay will occur in the proper direction to cause the stabilizing resistor R to be gradually excluded from circuit.

Although the torque of the auxiliary armature 25 of the speed relay 2 will vary with changes in supply-circuit voltage, such changes are also accompanied by corresponding variations in the main-field winding excitation and, consequently, the regulating action of the relay has the same effect as though the supply-circuit voltage remained constant.

It will be understood that, while I have illustrated the various relay motors as series-excited in order to produce relatively sensitive action thereof, such motors may be shunt-excited or compound-wound, if desired, to best meet the conditions imposed by any particular service.

In Fig. 3, the modification illustrated may be used for the purpose of interrupting the main-machine circuits in case of a relatively high regenerative current instead of causing the controller 6 to move backwardly, as described in connection with Fig. 1.

In this case, the shaft 37 for the auxiliary armatures 35 and 36 of the overload relay 3 is provided with a drum 140 upon which is mounted an interlock or contact segment 141 that is normally adapted to bridge stationary contact members 142, thus completing a circuit from the battery B through conductor 65, control fingers 66 and 67, which are connected by contact segment 68 of the master controller in any operative position thereof, conductor 143, coöperating stationary and movable contact members 142 and 141 of the overload relay, conductor 144, the parallel-related actuating coils of the switches 8 and 9 and conductor 145 to the negative battery terminal.

In case the action of the auxiliary armature 36, which is energized from the main-circuit shunting resistor 4, predominates over the torque of the other auxiliary armature 35 by reason of an increase above a predetermined value of the regenerated current, the control drum 140 is actuated into such a position that the contact segment 141 becomes disengaged from the control fingers 142 to thereby interrupt the energizing circuit of the actuating coils for the switches 8 and 9. In this way, the main circuits are interrupted immediately upon the occurrence of predetermined overload conditions.

It will thus be seen that I have provided a regenerative control system, wherein the speed of the momentum-driven vehicle may be maintained substantially constant over certain stretches of track, irrespective of the inherent tendencies of the machines, and, so far as I am aware, such a regenerative control system is unique, inasmuch as various systems of the prior art have been provided to automatically govern the main-machine torque or current values during the regenerative period, whereas the speed is inherently varied in accordance with grade and current conditions of the track.

Obviously, various other modifications of the system and the relay devices herein set forth may be effected without departing from the spirit and scope of my invention, and I desire, therefore, that only such limitations shall be imposed as are indicated in the appended claims.

I claim as my invention:

1. In a system of regenerative control, the combination with a supply circuit and a momentum-driven dynamo-electric machine, of independent means for inherently imparting a predetermined compound characteristic to said machine, and means coöperating with said independent means for automatically adjusting the machine speed.

2. In a system of regenerative control, the combination with a supply circuit and a momentum-driven dynamo-electric machine, of means for automatically re-adjusting the machine speed upon a departure thereof from a predetermined speed, and means for manually selecting said predetermined speed.

3. In a system of regenerative control, the combination with a supply circuit and a momentum-driven electric-vehicle motor, of means for automatically continuing a predetermined speed irrespective of grade or curve operation of the electric vehicle, and means for pre-selecting said speed.

4. In a system of regenerative control, the combination with a supply circuit and a momentum-driven dynamo-electric machine, of independent means for inherently imparting a predetermined compound characteristic to said machine, means coöperating with said independent means for automatically adjusting the machine speed, and other means for automatically limiting the regenerated current.

5. In a system of regenerative control, the combination with a supply circuit and a momentum-driven dynamo-electric machine, of means for automatically controlling the machine speed in accordance with predetermined conditions, means for manually adjusting said speed-controlling means, and automatic relay means for preventing the rise of regenerated current above a predetermined value.

6. In a system of regenerative control, the combination with a supply circuit and a momentum-driven electric-vehicle motor, of means for automatically continuing a predetermined speed, irrespective of grade or curve operation of the electric vehicle, means for pre-selecting said speed, and torque-relay means energized in accordance with main-armature and field-winding conditions for preventing the rise of regenerated current above a predetermined value.

7. In a system of regenerative control, the combination with a supply circuit and a momentum-driven dynamo-electric machine having an armature and a field-winding, of auxiliary means for exciting said field winding, and means for modifying the main-circuit connections whenever a predetermined ratio of armature ampere-turns to field-winding ampere-turns obtains.

8. In a system of regenerative control, the combination with a supply circuit and a momentum-driven dynamo-electric machine having an armature and a field-winding, of torque-relay means energized in accordance with main-armature and field-winding conditions for modifying the main-circuit connections to restore normal conditions whenever a predetermined ratio of armature ampere-turns to field-winding ampere-turns obtains.

9. In a system of regenerative control, the combination with a supply circuit and a momentum-driven dynamo-electric machine having an armature and a field-winding, of torque-relay means having opposing armatures respectively energized in accordance with main-armature current and field-winding voltage for varying the main-circuit resistance value to restore normal conditions whenever a predetermined ratio of armature ampere-turns to field-winding ampere-turns obtains.

10. In a system of regenerative control, the combination with a supply circuit and a momentum-driven dynamo-electric machine having an armature and a field-winding, of relay means energized in accordance with supply-circuit and main-field-winding conditions for automatically maintaining a substantially constant field strength under predetermined regenerative conditions.

11. In a system of regenerative control, the combination with a supply circuit and a momentum-driven dynamo-electric machine having an armature and a field winding, of torque-relay means having opposing armatures respectively energized in accordance with supply-circuit voltage and main-field-winding-voltage for automatically maintaining a substantially constant field strength, under predetermined regenerative conditions, and means for pre-selecting the value of said field strength.

12. In a system of regenerative control, the combination with a supply circuit and a momentum-driven dynamo-electric machine having an armature and a field winding, of torque-relay means having opposing armatures respectively energized in accordance with supply-circuit voltage and main-field-winding-voltage for automatically maintaining a substantially constant field strength under predetermined regenerative conditions, means for pre-selecting the value of said field strength, and similar torque-relay means having opposing armatures respectively energized in accordance with main-armature current and main-field-winding voltage for automatically preventing the rise of regenerated current above a predetermined value.

13. In a system of regenerative vehicle control, the combination with a supply circuit and a momentum-driven dynamo-electric machine inherently tending to decrease in speed in accordance with grade and curve conditions of the track, of means for automatically counteracting said inherent tendency to maintain a substantially constant machine speed within predetermined limits.

14. In a system of regenerative vehicle control, the combination with a supply circuit and a regeneratively-braking dynamo-electric machine of the series type, of means including independent exciter means for automatically maintaining a substantially constant machine speed, irrespective of grade and curve operation of the electric vehicle.

15. In a system of regenerative vehicle control, the combination with a dynamo-electric machine inherently operating in accordance with a relatively steep speed-current characteristic, of automatic control means for reducing the speed variations inherent with said characteristic.

16. In a system of control, the combination with a supply circuit and a dynamo-electric machine inherently operating in accordance with a relatively steep speed-current characteristic, of means for automatically opposing said inherent characteristic to produce a more nearly constant speed.

17. In a control system, the combination with a supply circuit and a dynamo-electric machine the speed of which varies inherently with the load, of means dependent upon the machine field strength for automatically producing a speed-current machine characteristic curve that is flatter than the corresponding inherent characteristic curve of the machine.

18. In a system of control, the combination with a supply circuit and a dynamo-electric machine having an armature and a field winding, of relay means energized in accordance with the supply-circuit and main-field-winding conditions for automatically re-adjusting the field strength to a predetermined value.

19. In a system of regenerative vehicle control, the combination with a supply circuit and a momentum-driven dynamo-electric machine, of relay means for automatically maintaining a given speed irrespective of grade or curve operation of the electric vehicle, and means for pre-selecting said speed.

In testimony whereof, I have hereunto subscribed my name this 28th day of Feb., 1917.

RUDOLF E. HELLMUND.